United States Patent [19]

Hayashi et al.

[11] Patent Number: 5,102,650
[45] Date of Patent: Apr. 7, 1992

[54] METHOD OF PREPARING NEEDLE-LIKE CONDUCTIVE ZINC OXIDE

[75] Inventors: Takao Hayashi; Norihiro Sato; Chikara Omotani, all of Shimonoseki; Manabu Hosoi, Omiya; Nobuyoshi Kasahara, Sayama, all of Japan; Günther Rudolph, Neuberg, Fed. Rep. of Germany; Wolf-Dieter Griebler, Moers, Fed. Rep. of Germany; Jörg Hocken, Dusseldorf, Fed. Rep. of Germany

[73] Assignees: Metallgesellschaft Aktiengesellschaft, Frankfurt am Main, Fed. Rep. of Germany; Mitsui Mining & Smelting Co., Ltd., Tokyo, Japan

[21] Appl. No.: 544,122

[22] Filed: Jun. 26, 1990

[30] Foreign Application Priority Data

Jun. 26, 1989 [JP] Japan .................................. 1-60823

[51] Int. Cl.$^5$ .................................. C01G 9/02
[52] U.S. Cl. .................................. 423/622; 423/101; 106/425; 106/426
[58] Field of Search .................. 423/622, 101, 102; 502/342, 343; 106/425, 426; 252/518; 428/402; 264/61

[56] References Cited

U.S. PATENT DOCUMENTS

| | | | |
|---|---|---|---|
| 3,538,022 | 11/1970 | Bowman | 423/622 |
| 3,703,413 | 11/1972 | Arrance | 429/217 |
| 3,902,888 | 9/1975 | Aonuma et al. | 75/349 |
| 4,005,061 | 1/1977 | Lemaire | 423/186 |
| 4,282,117 | 8/1981 | Muramoto et al. | 423/592 |
| 4,680,282 | 7/1987 | Blanchard et al. | 502/304 |
| 4,824,871 | 4/1989 | Shinomura | 252/511 |
| 4,880,703 | 11/1989 | Sakamoto et al. | 427/215 |
| 4,894,185 | 1/1990 | Djega-Mariadassou et la. | 252/518 |
| 4,960,654 | 10/1990 | Yoshinaka et al. | 428/614 |

FOREIGN PATENT DOCUMENTS

| | | | |
|---|---|---|---|
| 53-64958 | 6/1978 | Japan | 423/622 |
| 55-42282 | 3/1980 | Japan | 423/622 |
| 56-120518 | 9/1981 | Japan | 423/622 |
| 57-149827 | 9/1982 | Japan | 423/622 |
| 60-11226 | 1/1985 | Japan | 423/622 |
| 467124 | 3/1973 | U.S.S.R. | 423/622 |

OTHER PUBLICATIONS

74–Radiation Chem. Photochem. vol. 101, 1984–No. Sho 58-161923.
76–Electric Phenomena, vol. 99, 1983–No. 58-145620.
Chem. Absts. vol. 101, 1984–No. 59-97531.
Chem. Absts. vol. 105, 1986–No. 61-40338.
49–Industrial Inorganics, vol. 105, 1986; No. 61-86421.
74–Radiation Chem. Photochem. vol. 93, 1980–79,161,598.
Japan Kokai Tokkyo Koho-81-69,266.
Japan Kokai Tokkyo Koho 80,162,477.
Fujita, et al., "Crystal Shapes of Zinc Oxide Prepared by Homogeneous Precipitation Method"-Dept. of Chem. Faculty o Science, Tokai Univeristy, Yogyo-Kyokai SHI 92,227 (1984).
Handbook of Crystallographic Engineering, Kyoritu Publishing Ltd., Tokoyo, Japan, (1st. Ed. 1985) (with English Translation).

Primary Examiner—Michael Lewis
Assistant Examiner—Ngoc-Yen M. Nguyen
Attorney, Agent, or Firm—Felfe & Lynch

[57] ABSTRACT

Needle-like electrically conductive zinc oxide filler having low specific volume resistance and excellent electrical conductivity-imparting effect per unit weight thereof is provided, including a method for its preparation.

9 Claims, No Drawings

METHOD OF PREPARING NEEDLE-LIKE CONDUCTIVE ZINC OXIDE

FIELD OF THE INVENTION

The present invention relates to a needle-like electrically conductive zinc oxide filler which can be incorporated into paper, plastics, rubbers, resins, paints or the like, and a method for preparing the same. More particularly this invention relates to a needle-like electrically conductive zinc oxide filler having low specific volume resistance and quite excellent conductivity-imparting effect per unit weight thereof as well as a method for preparing the same.

BACKGROUND OF THE INVENTION

Fine powders capable of imparting conductivity to plastics and paints to which the powder is added are known, such as tin oxide type powders, zinc oxide type powders; powders of titanium oxide, aluminum oxide or the like coated with tin oxide; and fibrous materials such as potassium titanate fiber, gypsum fibers and glass fibers coated with electrically conductive tin oxide.

As is well known, to impart good electrical conductivity to plastics and paints, it is necessary to incorporate a large amount of powder thereinto so that every adjacent particle comes into contact with one another, thereby rendering the use of the conductive powder very expensive, and only fit for limited purposes.

To eliminate such a disadvantage, the use of the aforesaid needle-like powder has been proposed which has an extremely larger aspect ratio than that of spherical powder, which makes it possible to increase contact probability of added electric conductivity-imparting filler, even when used in a smaller amount.

However, all of such needle-like powders are obtained by coating a core material with an electrically conductive material. Although such a powder makes it possible to reduce the amount thereof to be used, the coated layer suffers from peeling off from the core material when it is added to plastics and paints for imparting electrical conductivity thereto and thus a desired conductivity-imparting effect can hardly be attained.

On the other hand, a variety of methods for preparing electrically conductive zinc oxides are disclosed, for instance, in Japanese Patent Laid-Open Application corresponding to OLS in Germany (hereinafter referred to as "J. P. KOHKAI") Nos. Sho 58-161923, Sho 58-145620, Sho 55-162477 and Sho 59-97531, Japanese Patent Publication corresponding to Auslege in Germany (hereinafter referred to as "J. P. KOHKOKU") No. Sho 55-19897 and U.S. Pat. No. 3,538,022. All of these methods however, relate to formation of spherical or particulate powder, but not the formation of needle-like conductive zinc oxide. Regarding methods for preparing needle-like zinc oxide, there are methods known according to a gas phase reaction such as disclosed, for instance, in "Handbook of Crystallographic Engineering", p. 720, issued by KYORITSU PUBLISHING CO., LTD., or those disclosed in "Bulletin of the Society of the Ceramic Industry", 1984, 92(4), p. 227. However, none of such methods relates to the production of electrically conductive zinc oxides.

In view of that set forth above, it is thus an object of the present invention to provide electrically conductive zinc oxide powder effective for greatly decreasing specific volume resistance of a base material such as a resin even if the powder is added to the base material in a relatively small amount compared to amounts of conventional materials required to produce the same effect, and which also has excellent whiteness.

It is a further object of the invention to provide a conductive powder which, when incorporated into a base material, does not lose its conductivity during mixing.

Additional objects of this invention will become apparent from the following description.

SUMMARY OF THE INVENTION

In accordance with the present invention, there is provided a zinc oxide filler in the shape of white needles having an appropriate electrical conductivity, and a process for the preparation thereof. The process comprises the steps of neutralizing, with an inorganic acid, a solution containing an alkali zincate compound and at least one water-soluble compound of a metal selected from the group consisting of tin, gallium, indium and aluminum; filtering the resulting co-precipitates; washing and drying the same; and then calcining the same in a reducing atmosphere. Moreover, it has been surprisingly and unexpectedly found that the conductive zinc oxide power of the present invention has a low specific volume resistance; that it is extremely effective in imparting electrical conductivity per unit weight thereof when it is incorporated into resins or paints, etc.; it does not suffer from problems concerning quality and toxicity; and it is an inexpensive, white, electrically conductive material.

DETAILED DESCRIPTION OF THE INVENTION

The present invention provides a method for the preparation of needle-like electrically conductive zinc oxide fillers which comprises neutralizing, with an inorganic acid such as sulfuric acid, nitric acid or hydrochloric acid, an alkaline solution containing an alkali zincate compound and at least one water-soluble compound of a metal selected from the group consisting of tin, gallium, indium and aluminum in an amount effective to provide a composition after calcination thereof comprising from 0.005 to 5 parts by weight of at least one member selected from the group consisting of tin oxide, gallium oxide, indium oxide and aluminum oxide as a dopant to 100 parts by weight of zinc oxide. The resultant co-precipitates thus obtained are filtered and washed with water to remove contaminant ions, the co-precipitates then dried at a temperature ranging from 80° C. to 150° C. and thereafter calcined in a reducing atmosphere for example, in a hydrogen-containing atmosphere, at 400° C. to about 800° C.

Preferred alkali zincate compounds useful herein include sodium zincate and potassium zincate because they are easily available and can be easily synthesized. The water-soluble metal compounds used as dopants may be any compound that can be converted into tin oxide, gallium oxide, indium oxide or aluminum oxide through calcination. Examples of these compounds include chlorides, nitrates, sulfates and acetates of tin, gallium, indium and aluminum; alkali metal salts of oxoacids of these metals; and combinations of two or more thereof.

The amount of water-soluble metal compound is selected in an amount of from 0.005 to 5 parts by weight, preferably from 0.01 to 1 part by weight, of such a compound to 100 parts by weight of zinc oxide after calcination. Although the dopants provide electrical conductivity-imparting effect if added singularly, they are preferably added in combination. If the amount of the dopants is less than the lower limit, the resultant zinc oxide powder shows great change in electrical conductivity with time which makes it difficult to obtain stable products in quality. On the other hand, if it exceeds the upper limit, not only the color tone of the resultant electrically conductive zinc oxide power has a tinge of black, but the powder also shows a decrease in electrical conductivity as well.

Prior to neutralizing the solution containing an alkali zincate compound and water-soluble metal compound, caustic soda or caustic potash is added thereto so that the alkali/zinc molar ratio, falls within the range of from 5 to 30, preferably from 7 to 15.

If the alkali/zinc molar ratio is less that the foregoing lower limit there is a tendency to cause hydrolysis due to delicate change in the temperature and concentration of the aforesaid solution resulting in the difficulty of achieving the present invention. There is also observed a strong tendency to form spherical or particulate zinc oxide powder making it quite difficult to obtain the needle-like co-precipitates of the present invention.

On the other hand, if the alkali/zinc molar ratio exceeds the foregoing upper limit, not only the amount of inorganic acid required for neutralization is increased, but also the amount of alkali remaining in the resultant zinc oxide increases. This leads to an increase in electrical resistance of the zinc oxide powder obtained.

The initial concentration of zinc ions in the neutralization reaction system is preferably 0.1 to 4 mol/l. The use of a zinc ion concentration less than this lower limit results in reduction of the productivity of zinc oxide and an increase in the amount of waste liquor, which in turn leads to an increase in the production costs. On the other hand, the use of a zinc ion concentration higher than the aforesaid upper limit leads to formation of particulate or tabular zinc oxide.

Preferred inorganic acids used for the neutralization reaction include sulfuric acid, nitric acid and hydrochloric acid because they are easily available in high purity.

The concentration of the inorganic acid used in the neutralization reaction preferably ranges from 5 to 20% by weight in order to obtain a needle-like electrically conductive zinc oxide having the desired properties.

The pH value at the end of the neutralization reaction is controlled to be within a desired range of from 7 to 12, depending, for example, upon the kinds of dopants used and the inorganic acid ion concentration at the end of the neutralization reaction. In other words, it is necessary to select a pH of the reaction system within a range where the dopant is sufficiently hydrolyzed and such that the neutralization is completed at a pH range in which basic zinc compounds are not formed.

The co-precipitates formed from the neutralization reaction are filtered off in a known manner, washed with water until the electrical conductivity of the filtrate reaches at most 300 $\mu$S/cm, and dried at a temperature ranging from 80° C. to 150° C. Then the dried coprecipitates as such without pulverization which are in the form of, for instance, bulk materials, blocks or pellets are calcined at a temperature of 400° C. to 800° C. in a reducing atmosphere including hydrogen gas. It is preferred that the calcination temperature is controlled to 400° to 550° C. in order to minimize loss of zinc oxide due to volatilization.

The co-precipitates obtained according to the method of the present invention consist substantially of zinc oxide at the stage of co-precipitation and, therefore, cause little vaporization of water to a lower partial vapor pressure of steam during the calcination under reducing atmospheres inclusive of hydrogen. Thus it is possible to decrease the amount of hydrogen required for establishing the reducing atmosphere for calcination. In other words, the co-precipitates can be calcined in an atmosphere having a lower hydrogen concentration or a lower flow rate thereof.

The needle-like electrically conductive zinc oxide filler prepared according to the present invention is white powder having an aspect ratio ranging from 10 to 200, preferably 20 to 100, and a specific volume resistance to $10^o$ to $10^2$ ohm-cm. In this respect, if the aspect ratio is less than 10, it is not generally expected to achieve such an effect inherent to needle-like fillers that good electrical conductivity is imparted to a base material even when they are used in a smaller amount. If the aspect ratio is more that 200, it is believed that they are only insufficiently dispersed in base materials such as plastics or rubbers when they are incorporated in the same.

The present invention is more fully illustrated by the following examples, which are for illustrative purposes only and are not intended to limit the scope of the invention or the claims in any way.

EXAMPLE 1

81.3 g of zinc chloride (purity: 99.8%) was dissolved in 1.5-liter of an aqueous solution containing 470 g of caustic soda (NaOH; purity: 95%) to adjust the NaOH/Zn molar ratio, to 11.2. 0.74 Gram of stannic chloride (purity: 98%) and 2.22g of aluminum chloride (purity: 96%) were added to and dissolved in the said solution and then water was added thereto to adjust the zinc concentration to 0.3 mol/l. The pH value of this solution as 13.3. Then, 2 kg of a sulfuric acid solution having a concentration of 20% was added to the solution over a period of 5 min. while stirring. At this time, the solution was still transparent and its pH was 12.6. Thereafter, a sulfuric acid solution having a concentration of 5% was added with stirring until the pH reached 10.5 for 120 min, while maintaining the temperature of the solution to 60° C. to complete the neutralization reaction. The coprecipitates thus formed were filtered off in a known manner, washed with water until the electrical conductivity of the filtrate reached a value of at highest 300 $\mu$S/cm, dried at 105° C. in the air and then calcined at 500° C. for 60 min in a hydrogen atmosphere to thus obtain 78 g of white zinc oxide powder.

The white zinc oxide powder had a tin oxide content of 0.45% and aluminum oxide content of 0.89%. In addition, the white zinc oxide powder was observed with a scanning electron microscope showing that the zinc oxide powder was needle-like in shape having a minor diameter of 0.2 $\mu$m and a major diameter of 5 $\mu$m (aspect ration: 25). The zinc oxide powder also showed an excellent specific volume resistance as low as $1.2 \times 10^1$ $\Omega$ cm. The results obtained are summarized below in Table I.

EXAMPLE 2

162.76 g of zinc chloride purity: 99.8%) was dissolved in 1.0-liter of an aqueous solution containing 640 g of NaOH (purity: 95%) to attain a molar ratio of NaOH/Zn to 8.1. 1.48 Grams of stannic chloride (purity: 98%) and 1.22 g of gallium chloride (purity 99.9%) were added to and dissolved in this solution, and water was added thereto to adjust the zinc concentration of 1.33 mole/l. Then, a sulfuric acid solution having a concentration of 20 wt % was added to the solution for 5 min with stirring until the pH value thereof reached 12.5. Thereafter, a sulfuric acid solution having a concentration of 5 wt % was added until the pH value of the solution reached 8.5 for 120 min while stirring the solution and maintaining the temperature thereof to 20° C. to complete the neutralization reaction. Thereafter, the same procedures as in Example 1 were repeated to obtain 160 g of needle-like electrically conductive zinc oxide having a tin oxide content of 0.48%, a gallium oxide content of 0.37%, a minor diameter of 0.05 μm, a major diameter of 3μ (aspect ratio: 60) and a specific volume resistance of $7 \times 10°$ Ω cm. The results obtained are summarized below in Table I.

TABLE I

| | Example 1 | | Example 2 | |
|---|---|---|---|---|
| Starting Solution | | | | |
| Zinc Salt (kind/g) | ZnCl$_2$ | 81.2 | ZnCl$_2$ | 162 |
| Zinc Concentration (m/l) | | 0.3 | | 1.33 |
| Alkali (kind/g) | NaOH | 447 | NaOH | 608 |
| Molar Ratio, NaOH/Zn | | 11.2 | | 8.1 |
| Dopant (kind/g) | SnCl$_4$ | 0.73 | SnCl$_4$ | 1.45 |
| ditto (kind/g) | AlCl$_3$ | 2.13 | GaCl$_3$ | 1.22 |
| Neutralization | | | | |
| pH of reaction system: | initial | 13.3 | | — |
| | in the course | 12.6 | | 12.5 |
| | final | 10.5 | | 8.5 |
| Drying Temp. (°C.) | | 105 | | 105 |
| Calcination | | | | |
| Temp (°C.) | | 500 | | 500 |
| Time (min) | | 60 | | 60 |
| Atmosphere | | H$_2$ | | H$_2$ |
| Zinc Oxide Product | | | | |
| Composition (wt. %) | SnO$_2$ | 0.45 | SnO$_2$ | 0.48 |
| | Al$_2$O$_3$ | 0.89 | Ga$_2$O$_3$ | 0.37 |
| Minor Diameter (μm) | | 0.2 | | 0.05 |
| Major Diameter (μm) | | 5 | | 3 |
| Aspect Ratio (major/minor) | | 25 | | 60 |
| Specific volume resistance (Ω cm) | | $1.2 \times 10^1$ | | $7 \times 10°$ |

REFERENCE EXAMPLE 1

30 Parts by weight of the needle-like electrically conductive zinc oxide (specific volume resistance $1.2 \times 10^1$ Ω cm) obtained in Example 1 was kneaded together with 70 parts by weight of PVC resin powder and then rolled with heating into a white PVC sheet (20 μm in thickness). The specific volume resistance of this sheet was $2 \times 10^6$ Ω cm. The results are listed below in Table II.

30 or 70 parts by weight of usual spherical electrically conductive zinc oxide (specific volume resistance: $1.2 \times 10°$ Ω cm) was admixed with 70 or 30 parts by weight of PVC resin powder respectively, then the resultant blends were rolled with hearing to obtain white PVC sheets (20 μm in thickness). The specific volume resistances thereof were $1 \times 10^{11}$ and $2 \times 10^6$ Ω cm, respectively. The results are listed below in Table II.

As seen from the results obtained in Reference Example 1, although the specific volume resistance of the needle-like electrically conductive zinc oxide per se according to the present invention is 10 times larger than that of the usual spherical electrically conductive zinc oxide, the former shows unexpectedly good electrical conductivity-imparting effect. As shown, the resultant PVC sheet into which the needle-like electrically conductive zinc oxide was incorporated had a very low specific volume resistance (1/5,000) compared with that of the PVC sheet into which the same amount of the usual spherical electrically conductive zinc oxide was incorporated.

A process for the preparation of spherical electrically conductive zinc oxide, including its composition and properties, used in this Reference Example are as follows:

Method for Preparation: Co-precipitates obtained through a neutralization reaction of an aqueous solution containing zinc chloride, tin chloride and gallium chloride with caustic soda (sodium hydroxide) is calcined at 500° C. in a hydrogen atmosphere.

| | |
|---|---|
| Composition: | ZNO/SnO$_2$/Ga$_2$O$_3$ = 100/0.5/0.4 (parts by weight). |
| Particle Size (average): | 0.8 μm |
| Specific Surface Area: | 6.7 m$^2$/g |

TABLE II

| Shape of Electrically Conductive Zinc Oxide | Amount Incorporated (% by weight) | Specific volume Resistance of Sheet (Ω cm) |
|---|---|---|
| Needle-like | 30 | $2 \times 10^6$ |
| Spherical | 30 | $1 \times 10^{11}$ |
| Spherical | 70 | $2 \times 10^6$ |

The needle-like electrically conductive zinc oxides according to the present invention have good electrical conductivity by itself and can impart excellent electrical conductivity to a base material such as resins, rubbers or paints even when it is incorporated thereinto in a relatively small amount compared to spherical electrically conductive zinc oxides. In particular, as shown above, when a resin to which the needle-like electrically conductive zinc oxide of the present invention is added is compared with that to which the same amount of a conventional spherical electrically conductive zinc oxide is added, the needle-like electrically conductive zinc oxide shows significantly improved electrical conductivity-imparting effect inherent to the needle-like shape of zinc oxide.

In the needle-like electrically conductive zinc oxide, zinc oxide per se is made electrically conductive by doping a dopant and, therefore, the needle-like electrically conductive zinc oxide never causes peeling off of an electrically conductive coating due to mechanical actions such as friction encountered when it is incorporated into a base material and hence it does not lose its electrical conductivity.

Further, the needle-like electrically conductive zinc oxide is white and thus any color tone may be imparted to a base material by simultaneously using it with other organic coloring pigments or the like.

Also, since the electrically conductive zinc oxide filler of the present invention has a needle-like shape, it exerts, on a base material such as resins, mechanical reinforcing effect such an improvement in flexural modulus, impact resistance and tensile strength.

The needle-like electrically conductive zinc oxide filler of the invention does not cause any problems of toxicity, burning characteristics or the like, and since the needle-like electrically conductive zinc oxide of the present invention is obtained using inexpensive zinc oxide as a starting material, it greatly reduces the production cost thereof.

What is claimed is:

1. A method for the production of needle-like electrically conductive zinc oxide comprising, neutralizing an aqueous solution containing an alkali zincate compound and at least one water-soluble compound of a metal selected from the group consisting of tin, gallium, indium and aluminum in an amount effective to form a metal oxide thereof in the range of from 0.005 to 5 parts by weight with reference to zinc oxide, and obtaining coprecipitates;

filtering said coprecipitates; washing and drying said coprecipitates; then calcining said coprecipitates in a reducing environment.

2. The method of claim 1, wherein neutralization is carried out with an inorganic acid selected from the group consisting of sulfuric acid, nitric acid or hydrochloric acid.

3. The method of claim 1 wherein the alkali zincate compound is selected from sodium zincate and potassium zincate.

4. The method of claim 1, 2 or 3 wherein the aqueous solution further contains caustic soda or caustic potash in an amount effective to form an alkali/zinc molar ratio in said solution ranging from 5 to 30.

5. The method of claim 4 wherein the caustic soda or caustic potash is present in an amount effective to form an alkali/zinc molar ratio from 7 to 15.

6. The method of claim 4, wherein during the neutralization of the aqueous solution containing an alkali zincate compound and at least one water-soluble metal compound the initial concentration of the alkali zincate solution is 0.1 to 4 mol/l and the acid used for neutralization ranges from 5 to 20% by weight.

7. The method of claim 6 wherein the neutralization is performed in a manner to obtain a pH at the end of the neutralization reaction within the range of from 7 to 12.

8. The method of claim 7 wherein the coprecipitates obtained after the neutralization reaction are filtered and washed with water until the electrical conductivity of the filtrate reaches 30 $\mu$S/cm, then dried at a temperature from 80° C. to 150° C., and calcined at a temperature of from 400° C. to 800° C. in a reducing atmosphere.

9. The method of claim 7 wherein the filtered, washed and dried coprecipitates are calcined at a temperature of from 400° C. to 550° C.

* * * * *